G. E. Hedges. Adjustable Mitre Box.

№ 117538

PATENTED AUG 1 1871

Witnesses:
E. Wolff
Wm. H. C. Smith

Inventor:
G. E. Hedges
per Munn & Co
Attorneys.

UNITED STATES PATENT OFFICE.

GEORGE E. HEDGES, OF ASHLAND, NEBRASKA.

IMPROVEMENT IN MITER-BOXES.

Specification forming part of Letters Patent No. 117,538, dated August 1, 1871.

*To all whom it may concern:*

Be it known that I, GEORGE E. HEDGES, of Ashland, in the county of Saunders and State of Nebraska, have invented a new and useful Improvement in Adjustable Miter-Box; and I do hereby declare that the following is a full, clear, and exact description thereof, which will enable others skilled in the art to make and use the same, reference being had to the accompanying drawing forming part of this specification.

My invention consists in improving the means for maintaining miter-saws in their true position, as hereinafter fully described and subsequently pointed out in the claim.

Figure 1:
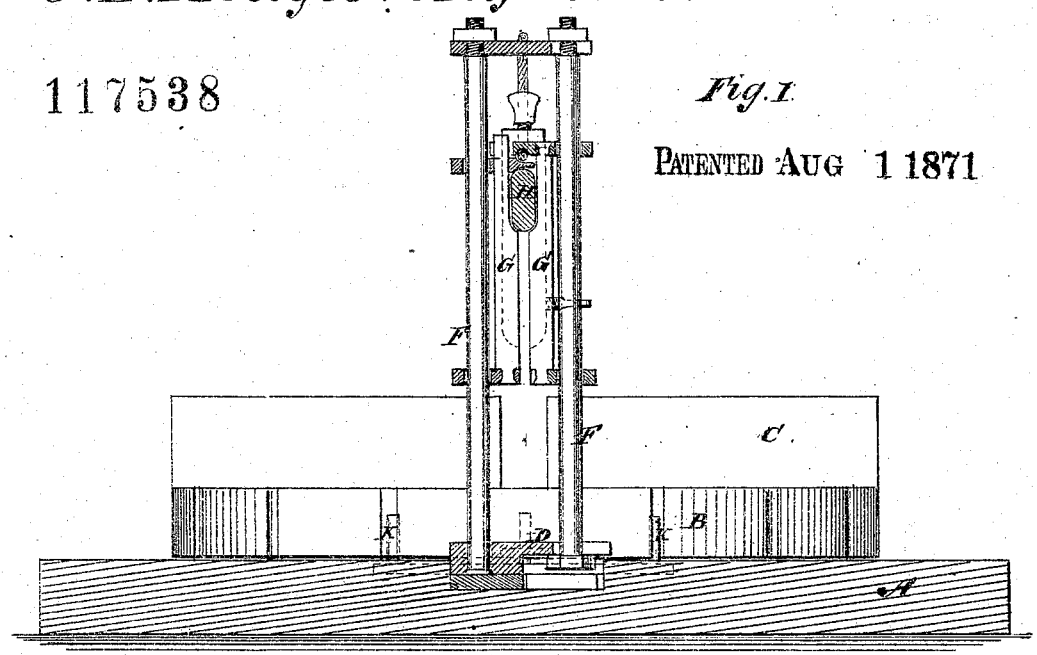
Figure 2:
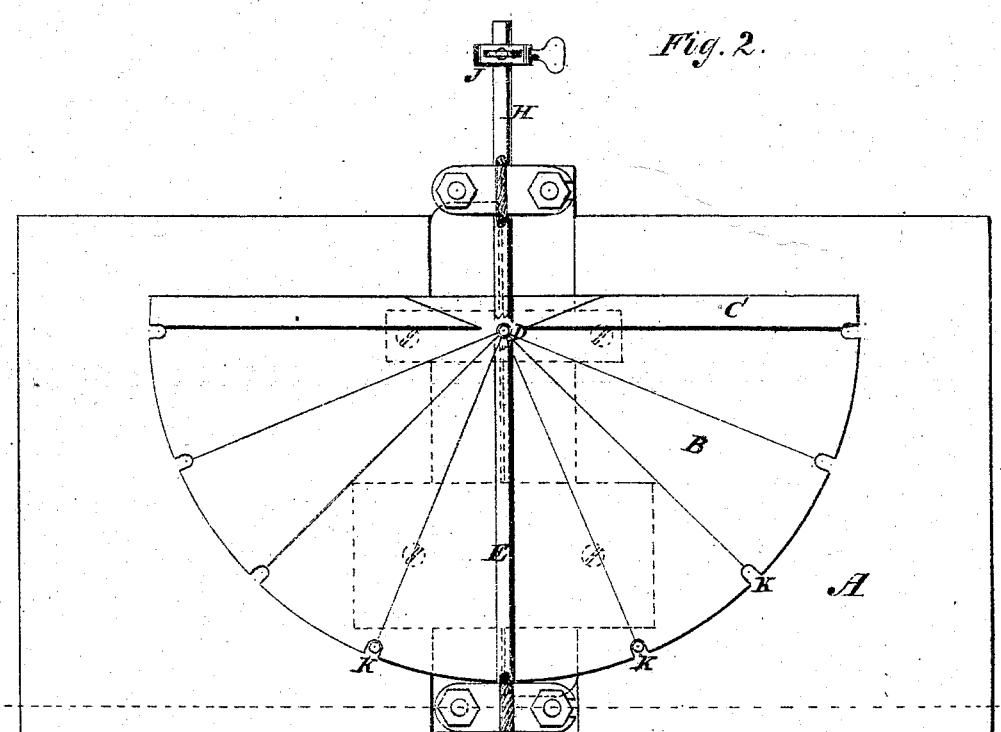

In the accompanying drawing, Figure 1 represents an elevation of the apparatus. Fig. 2 is a top or plan view.

Similar letters of reference indicate corresponding parts.

A is the bed-plate. B is the platform or plate on which the piece to be sawed is laid. C is a flange on the straight side of the plate B, forming, with the movable plate, an angle for the piece to rest in, as that of all miter-boxes. For convenience, this plate or platform is made semicircular from the flange C, and is pivoted at the center of the circle to the bed-plate A, as seen at D. The box turns on this pivot, and may be secured on the bed in any desired position, so as to saw a piece of wood at a true miter or any other angle. E is the saw-line, which passes at a right angle across the bed and directly through the central pivot D. F represents uprights (two at each end of the saw-line) connected together at top and bottom, but in such a manner that one of each pair is adjustable toward or from the other, so that the saw-guides may be made to suit saws of different thicknesses. G represents the saw-guides, a pair for each pair of uprights F. These guides are connected together at their top ends, and are attached to the uprights F so as to slide up and down and govern the saw. The saw-back H is attached, between the guides at their upper ends, to the saw by a set-screw, and supported in position by two arms, of which the first receives the saw near the handle, and the second is adjustable on the back. The saw and back being thus attached, the teeth are thrown below the guides to prevent injurious contact with the metal. The upright posts and guides are made of metal, and are consequently not liable to get out of order like miter-boxes made of wood. The guides with the saw-back are suspended from the top of the uprights by light springs, but so that, while their weight will be supported, the saw will work down into the wood with but slight pressure. The box B is adjusted on the bed by means of lugs or pins which enter the slots K, as seen in the drawing.

Having thus described my invention, I claim as new and desire to secure by Letters Patent—

1. The saw-back H, having arms I J from which the saw is suspended between its guides, as and for the purpose specified.

2. A saw sliding with its guides G G, when suspended by springs, as and for the purpose specified.

GEORGE E. HEDGES.

Witnesses:
PETER L. LEFEBVRE,
J. G. MILLER.